Patented Mar. 3, 1931

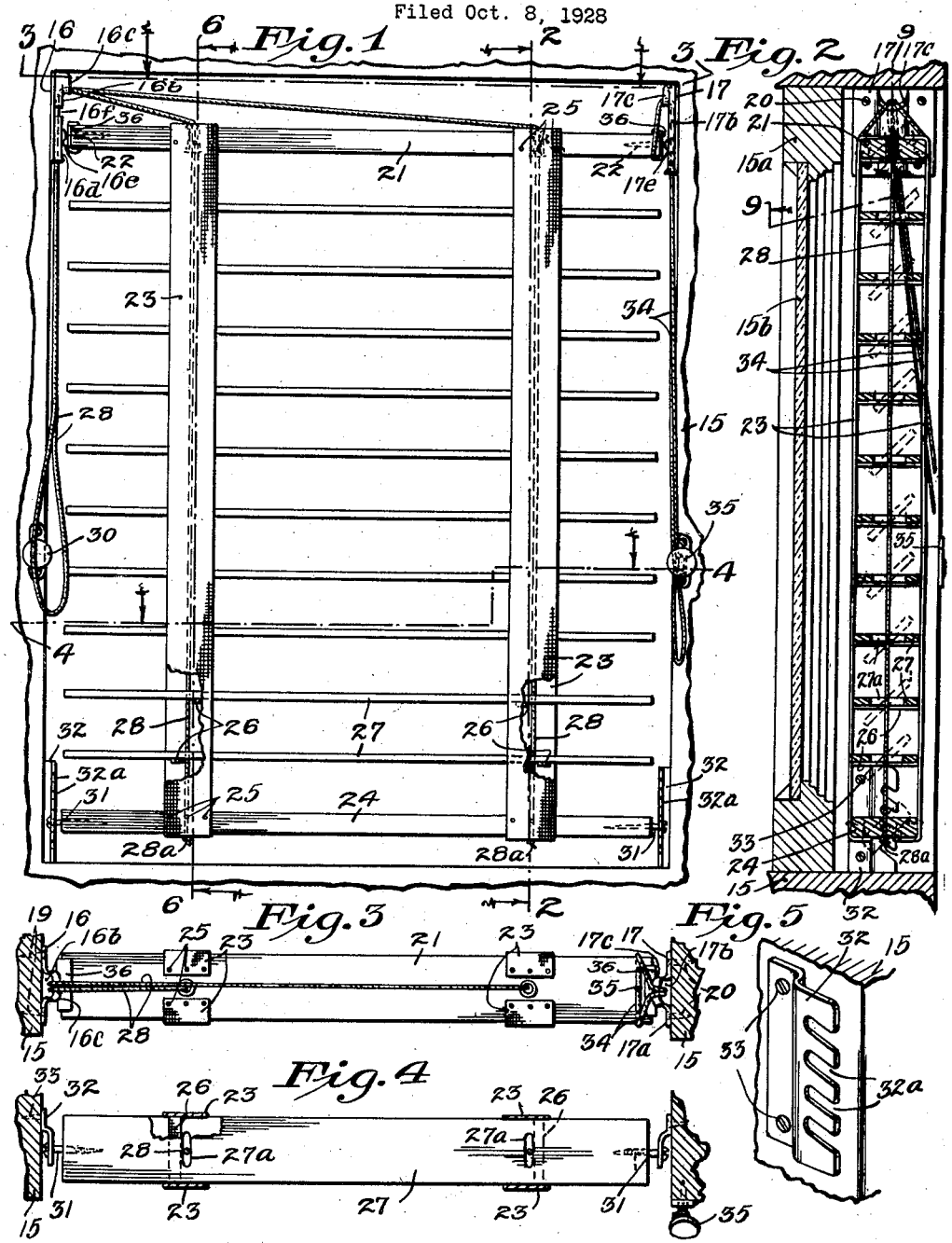

1,794,500

UNITED STATES PATENT OFFICE

ZACHARY E. RUSSELL, OF SAUK RAPIDS, MINNESOTA

ANTIWHIPPING DEVICE FOR BLINDS

Application filed October 8, 1928. Serial No. 310,957.

This invention relates to a blind or shade and particularly to means for preventing the blind swinging or whipping at the bottom thereof. Blinds or shades are now commonly supported in depending position and are free to swing about their top support. When such a blind is disposed with its lower end adjacent an open window or in a current of air, the blind is swung at its bottom and often times it is rapidly vibrated or whipped so that the blind is moved out of the desired position and the bottom thereof often damaged.

It is an object of this invention to provide an extremely simple and efficient means or anti-whipping device adapted to be disposed at the bottom of the blind for holding it in the desired position.

It is a further object of the invention to provide such an anti-whipping device comprising a simple bracket adapted to be secured at either side of the blind and to be engaged by means secured to the blind at the bottom thereof.

It is more specifically an object of the invention to provide an anti-whipping device for a blind comprising brackets adapted to be secured at each side of the blind which brackets have spaced downwardly extending slots therein adapted to receive headed pins or other members projecting from the bottom member of the blind, the blind preferably being under some tension when said pins are engaged in said brackets.

These and other objects and advantages of the invention will be fully set forth in the following description made in connection with the accompanying drawings, in which like reference characters refer to similar parts throughout the several views and in which:—

Fig. 1 is a view in front elevation of the blind, certain portions being broken away and other portions shown in vertical section;

Fig. 2 is a vertical section taken on line 2—2 of Fig. 1 as indicated by the arrow;

Fig. 3 is a horizontal section taken on line 3—3 of Fig. 1, as indicated by the arrow;

Fig. 4 is a horizontal section taken on line 4—4 of Fig. 1, as indicated by the arrow; and Fig. 5 is a perspective view illustrating one of the holding brackets.

Referring to the drawings, the frame of a window or other opening is illustrated as 15, which frame is shown as having a rectangular opening therein. The window 15a is shown at one side of said opening, comprising a pane 15b. A bracket 16 is supported at the upper left hand portion of said opening and secured to the side of said frame. While this bracket might be varied in structure, in the embodiment of the invention illustrated the same is shown as comprising side flanges 16a substantially rectangular in shape, an upper outwardly extending channel forming portion 16b shown as substantially rectangular in horizontal cross section, which portion 16b has a curved outwardly extending lip 16c which forms a guide for a flexible member or cord, being used with the blind. The bracket has another outwardly extending channel forming portion 16d spaced a short distance below the portion 16b, which portion 16d has a substantially circular outwardly pressed boss 16e thereon, and has a vertical open-ended slot extending from substantially the center of said boss to its upper end. The lower edge of portion 16d is flared outwardly as shown in Fig. 1. The flange portions 16a each have holes adjacent the top and bottom for receiving attaching screws or bolts 19. A bracket 17 is secured to casing 15 at the upper right hand side thereof, and while this bracket might be varied in form, in the embodiment of the invention illustrated, it is shown as comprising side flanges 17a substantially rectangular and having holes adjacent their top and bottom edges to receive attaching screws or bolts 20. Bracket 17 also has a channel-forming portion 17b extending outwardly and between flanges 17a, the upper portion of which has a curved projecting lip 17c adapted to form a guide for a cord used with the blind, to be later described. The portion 17b has an outwardly pressed substantially circular boss 17e thereon, having therein a hole. The lower edge of portion 17b is flared outwardly as shown in Fig. 1. A bar 21 is provided, substantially rectangular in cross section and having trunnion pins 22 projecting from the ends thereof substantially centrally of the ends of said bar. One of the pins 22 is received in the slot in boss 16e of bracket 16 and rests in the bottom thereof, and the other pin 22 extends into the hole 17d in bracket 17.

While any kind of a shade or blind can be used with the invention, the same is illustrated in connection with a blind of the Venetian type. The bar 21 has flexible straps 23 preferably of fabric material, such as canvas, secured to its sides adjacent each end, which straps extend downwardly and are connected at their lower ends to a similar bar 24 at the bottom of the curtain. While said straps could be connected to the bars in various ways, in the embodiment of the invention illustrated they are shown as secured by a plurality of small tacks 25. The straps 23 at opposite sides of the bar are connected by narrow strips of fabric 26. Supported on the strips of fabric 26 is a plurality of horizontally extending comparatively thin slats 27. Each of the slats 27 has an elongated slot 27a adjacent either end, extending transversely at the central portion thereof, and cords 28 extend through the slots 27a of the slats 27, said cords having knots or other means 28a at their lower ends below the bar 24. It will be seen that the strips 26 are alternately at opposite sides of the cords 28 and slots 27a. The cords 28 extend upwardly through holes in bar 21, which preferably are equipped with thimbles through which said cords pass, and said cords then extend into the channel-forming portions 16b and 16d of the bracket 16, said cords extending over the lip 16c. The cords 28 are formed of one strand and the loop portion depends at one side of the frame 15 and is adapted to be wrapped around a bracket 30 having a central portion secured to said frame, and an upwardly and outwardly extending headed portion.

The bar 21 has secured to its ends a small box-like sheet metal plate 36, the top and bottom sides of which extend over the top and bottom of bar 21 and the opposite ends of which are seated in slots in the ends of said bar. Plate 36 has a central recess or depression at its ends which fits over the projecting bosses 16e and 17e on brackets 16 and 17 respectively.

The anti-whipping device is formed as follows:

The bar 24 has headed pins or screws 31 projecting from the ends thereof, substantially alined with its central longitudinal axes, which are adapted to be received in the spaced downwardly extending slots 32a of brackets 32 secured to the sides of the frame 15 at the bottom of the opening therein by the screws 33. It will be seen that the portion of bracket 32 having slots 32a therein is offset from the portion thereof secured to frame 15, as clearly shown in Figs. 1 and 5.

The bar 21 has at one end and in the embodiment of the invention illustrated, the end adjacent bracket 17, a flexible member or cord 34 secured to the sides thereof in any suitable manner. The strands of said cord pass upwardly from the sides of said bar and over the lip 17c of bracket 17 and then downwardly through the channel in portion 17b of bracket 17. The ends of cord 34 are adapted to be wound around a bracket 35 similar to the bracket 30 already described and secured to the opposite side of the window.

In operation, the blind may occupy the position shown in Fig. 1, at which time the bar 21 is supported in the brackets 16 and 17 and the blind depends therefrom. When the blind thus depends it will be seen that the bottom thereof can swing or be whipped by the wind. To prevent this, the bar 24 is depressed to place the blind or shade under some tension and the pins 31 are engaged in one of the slots 32a of the bracket 32, the heads of said pins being disposed at the outer side of the brackets 32. With the pins 31 so engaged in brackets 32, the lower end of the blind or shade is held stationary and the same cannot swing or be whipped in the wind.

The slats 27 can be turned to different angular positions as indicated in dotted lines in Fig. 2, by moving the ends of cord 34. The strands of cord 34 after the slats are adjusted can be wrapped around bracket 35. The slats 27 are thus held in the position to which they are moved or adjusted. When it is desired to raise the shade, the strands of cord 28 will be pulled upon and the same will be drawn through the bracket 16. As the ends of the cord rise, bar 24 is raised by the knots 28a and the slats 27 are successively engaged. The blind is held in the desired pulled-up position by winding the cord 28 about the bracket 30.

When the cord 28 is pulled upon there is a component of force which tends to raise the bar 21. There is a small chance that this bar might be raised and the pintle 22 moved out of the slotted boss 16e. When the cord 28 is so pulled upon the bar 21 moves to the left as shown in Fig. 1 and the recess of plate 36 embraces the boss 16e. The lower edge of said recess, therefore, engages the lower edge of said boss, and this prevents bar 21 from rising. It is impossible, therefore, to lift the end of said bar and move screw 22 out of slot 16f.

From the above description it is seen that applicant has provided a very simple and efficient holding means or anti-whipping device for a blind. While the structure has been illustrated in connection with the Venetian blind, it is obvious that it is equally applicable to any kind of a shade or blind. The structure is exceedingly simple and yet is very efficient. The small plates 32 can be set well into the window frame as shown in Figs. 1 and 2 and will not interfere with the blind when the same is pulled down. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, and in the novel parts and combinations of parts disclosed and defined in the appended claims.

What is claimed is:—

1. A fastening device for the free end of a blind, comprising a member having a flange for attachment to a surface and having a portion disposed in a different plane from said flange with a free vertical edge, said portion having downwardly inclined vertical spaced slots therein having open ends opening into said free edge and adapted to receive a member attached to said blind.

2. A fastening device for the free end of a blind, comprising a plate having means for securing it to a surface and having an off-set portion spaced from said surface and having a free edge, said off-set portion having formed therein a plurality of downwardly inclined spaced slots opening into said free edge, each adapted to receive means carried by the blind for holding the blind against movement.

3. A fastening device for holding the free end of a blind in various positions comprising a bracket having means for securing the same to a surface and having a flange disposed in a plane extending substantially perpendicular to the plane of said blind, said flange having a free vertical edge directed away from said blind and having at least three spaced open ended slots therein directed downwardly and outwardly to their open ends and adapted to receive stop members at the sides of the blind bottom.

In testimony whereof I affix my signature.

ZACHARY E. RUSSELL.